United States Patent [19]

Richard et al.

[11] Patent Number: 4,590,177
[45] Date of Patent: May 20, 1986

[54] METHOD FOR PREPARING DUAL COLLOID CATALYST COMPOSITIONS

[75] Inventors: Michael A. Richard, Fanwood; Thomas H. Vanderspurt, East Amwell Township, Hunterdon County; Angelo A. Montagna, Summit, all of N.J.

[73] Assignee: Exxon Research and Engineering Co., Florham Park, N.J.

[21] Appl. No.: 639,442

[22] Filed: Aug. 10, 1984

[51] Int. Cl.$^4$ .......................... B01J 21/04; B01J 23/78
[52] U.S. Cl. .................................... 502/328; 502/177; 502/200; 502/241; 502/243; 502/250; 502/254; 502/256; 502/258; 502/259; 502/260; 502/261; 502/302; 502/303; 502/304; 502/313; 502/315; 502/316; 502/330; 502/332; 502/335; 502/336
[58] Field of Search .............. 502/177, 200, 315, 316, 502/328, 330, 335, 336, 241, 243, 250, 254, 256, 258, 259, 260, 261, 302, 303, 304, 313, 332; 252/315.01, 315.6, 315.7

[56] References Cited

U.S. PATENT DOCUMENTS

| | | | |
|---|---|---|---|
| 2,910,444 | 10/1959 | Cramer | 252/315.01 |
| 3,230,034 | 1/1966 | Stiles | 423/213.5 |
| 3,317,439 | 5/1967 | Stiles et al. | 252/455 |
| 3,421,870 | 1/1969 | Sinfelt et al. | 502/335 X |
| 3,770,658 | 11/1973 | Ozaki et al. | 252/443 |
| 3,839,229 | 10/1974 | Senes et al. | 252/455 R |
| 4,309,311 | 1/1982 | Johnson et al. | 252/438 |

FOREIGN PATENT DOCUMENTS

| | | |
|---|---|---|
| 998990 | 10/1976 | Canada . |
| 253122 | 5/1927 | United Kingdom . |
| 247225 | 6/1927 | United Kingdom . |
| 273735 | 12/1928 | United Kingdom . |
| 1515604 | 6/1978 | United Kingdom . |

OTHER PUBLICATIONS

"Effect of the Composition of a Nitrogen-Hydrogen Mixture on the Activity of Ferrocyanide Catalysts for Ammonia Synthesis" by Rakhmat-Zade et al., (1974).
"Activation of Nitrogen by Alkali Metal Promoted Transition Metal I. Ammonia Synthesis over Ruthenium Promoted by Alkali Metal" by Aika et al., (1972).
"Catalytic Properties of Montmorillonite-Stabilized Ferrocyanide Catalysts in the Ammonia Synthesis Reaction" by E. Kharchenko et al., (1974).
"Synthesis of FeReN(CN)$_4$H$_2$O and Tests of its Catalytic Activity in Ammonia Synthesis" by Y. Lyubchenko et al.
"Development of Alkali-Promoted Ruthenium as a Novel Catalyst for Ammonia Synthesis" by A. Ozaki (1981).
"Catalytic Activity of Systems Based on Coordination Cyanides of Cooper, Iron Ruthenium, and Osmium in the Reaction of Ammonio Synthesis" by Tkachenko et al.
"Ruthenium Catalysts for Ammonia Synthesis Prepared by Different Methods" by A. Ozaki et al.
"Study of the Thermal Dissociation of Prussion Blue" by Zarovnyatnykh et al.
"Ammonia Synthesis With Catalysts Derived From Complex Iron Cyanides" by A. Mittasch.

Primary Examiner—W. J. Shine
Attorney, Agent, or Firm—Henry E. Naylor

[57] ABSTRACT

Disclosed is a method for preparing dual colloid catalyst compositions wherein a gel, or colloidal suspension is formed by admixing (a) a 0.6 to 10M aqueous solution containing one or more soluble salts or complexes of one or more transition metals, wherein at least one of the transition metals is reducible and hydrolyzable, and one or more elements selected from Cr, Al, Si, Th, U, the lanthanides, and elements from Groups IA and IIA of the Periodic Table of the Elements, with (b) a 0.5 to 10N aqueous base solution. The solid material is separated from the resulting gel, or colloidal suspension and washed and dried.

41 Claims, No Drawings

METHOD FOR PREPARING DUAL COLLOID CATALYST COMPOSITIONS

FIELD OF THE INVENTION

The present invention relates to a method for producing catalyst compositions comprised of colloid size transition metal crystallites interspersed with colloid size promoter phase particles.

BACKGROUND OF THE INVENTION

Because of their value to industrial chemical processes, many catalysts and catalytic processes have been developed over the years. One important class of catalysts is heterogeneous catalysts which can generally be classified as either supported metal catalysts or massive metal catalysts, also sometimes referred to as bulk metal catalysts.

Supported metal catalysts are usually comprised of relatively small metal crystallites on relatively large support particles. The support particles may also act as a promoter for the active ingredients of the catalyst. Because the metal crystallites are small compared to the support particles, the effective metal surface area per unit volume of catalyst is relatively small, thus limiting the potential activity of the catalyst.

In contrast, massive metal catalysts, such as the well known magnetite or spinel-based ammonia synthesis catalysts, or Raney metal type catalysts, have metal domains having dimensions which are usually far greater than any promoter phase particles or promoter species which may be present. The effective metal surface area per unit volume of catalyst is also relatively small limiting the potential activity of the catalyst. To maximize the effective catalytically active surface area per unit volume, it would be desirable to produce a catalyst having a median metal crystallite, or domain, size of about 25 Å to about 500 Å in diameter. The desired crystallite size, of course, depends on the intended application. For example, crystallite sizes in the range of 25 Å to 250 Å are desired for catalyzing reactions involving relatively small substrate molecules, while larger crystallites, in the range of 250 Å to 500 Å, are desired for catalyzing reactions involving large substrate molecules. By effective metal surface area per unit volume of catalyst we mean metal area accessible to reactants. Because of the demanding nature of certain catalytic reactions (e.g. ammonia synthesis) the surface area of very small metal crystallites may be either ineffective or non-selective.

Although it is possible to conventionally produce supported metal catalysts containing metal crystallites having a median diameter within the 25 Å to 500 Å range, it can only be done with relatively large support particles, or a relatively large pore support, thus the effective surface area suffers and a catalyst is produced having less activity then it would otherwise have if the support particles were smaller.

One commercially significant route of catalyst preparation is by precipitation methods. For example, U.S. Pat. No. 4,251,672 teaches a method for preparing nickel hydrogenation catalyst precursors by coprecipitation of a catalyst support and the catalyst from aqueous solutions at or near the boiling point of the solutions. Such a process usually employs a seeding agent such as kieselguhr to form a suspension. After reduction the resulting catalyst usually consists of active metal on relatively large support particles. Another representative disclosure of precipitation methods to produce catalysts, particularly ammonia synthesis catalysts, in U.S. Pat. No. 3,840,479 which also utilizes a suspension of a supporting material. It is disclosed in that patent that iron must, by necessity, be present in the bivalent state prior to precipitation, which precipitation is carried out at a pH of about 2 to 6.5.

Precipitated iron catalysts for ammonia synthesis have also been described recently by Klisurski, Mitov, and Tomov (Stud. Surf. Sci. Catal. 16 (1983) 421). The process described involves forming a solid solution of $Al_2O_3$ in $\alpha$-$Fe_2O_3$ by heating to 800° C. in air coprecipitated iron and aluminum hydroxides. The resulting crystalline masses were characterized by X-ray diffraction and the reduced catalytic materials had surface areas in the range of about 1 to 30 $m^2/gm$. They showed that, with addition of appropriate promoters, the catalytic activity for ammonia synthesis of these catalysts was comparable to or slightly higher than that of a conventional industrial catalyst. The catalyst precursors of the present invention are amorphous rather than crystalline and after reduction have surface areas in the range of 10 to 150 $m^2/gm$. Further, the catalysts of the present invention have ammonia synthesis activities substantially greater than conventional industrial catalysts.

A new class of catalyst, which is referred to herein as dual colloid catalyst are disclosed in a copending patent application and U.S. Ser. No. 639,439 filed on the same day as this application, which disclosure is incorporated herein by reference.

Although several techniques have met with varying degrees of commercial success for producing catalyst compositions, there still exists a great need in the art for new techniques of producing catalyst compositions, such as the dual colloid catalysts.

SUMMARY OF THE INVENTION

In accordance with the present invention there is provided a method for preparing amorphous catalyst precursor compositions. The method comprises:

(I) forming a gel, or colloidal suspension, by admixing, under sufficient agitation, (a) a 0.5 to 10M aqueous solution containing one or more soluble salts or complexes of one or more transition metals selected from Groups IB, IIB, VIB, VIIB, and VIII of the Periodic Table of the Elements, and wherein at least one of the transition metals is reducible and hydrolyzable, and one or more other elements selected from the group consisting of Cr, Al, Si, Th, U, the lanthanides, and elements of Groups IA and IIA of the Periodic Table of the Elements, with (b) a 0.5 to 10N aqueous base solution to cause the formation of a gel or colloidal suspension;

(II) separating the solid precursor from the liquid phase of the admixture of (I) above;

(III) washing the precursor with water; and (IV) drying the precursor.

The method of the instant invention also comprises:

(a) forming a gel, or colloidal suspension, by admixing (i) one or more solutions containing one or more soluble salts or complexes of one or more elements selected from the group consisting of Cr, Al, Si, Th, U, the lanthanides, and elements of Groups IA and IIA of the Periodic Table of the Elements, with (ii) a 0.5 to 10N aqueous base solution to cause the formation of a gel or colloidal suspension, (b) adding to the gel, or colloidal suspension of (a) above, an aqueous solution containing at least one soluble salt or complex of one or more transition metals selected from Groups IB, IIB, VIB, VIIB, and VIII of the Periodic Table of the Elements, and wherein at least one of the transition metals is reducible and hydrolyzable;

(c) maintaining the pH of the the resulting admixture at a sufficient basicity to maintain the admixture in gel or colloidal form, and to ensure hydrolysis of the hydrolyzable transition metal cations;

(d) separating the solid precursor from the liquid phase of the admixture of (c) above;

(e) washing the precursor with water; and (f) drying the precursor.

Also within the scope of the present invention is a method comprising:

(a) admixing (i) an aqueous transition metal nitrate solution with (ii) a soluble base, having a $pK_b$, from about 6 to 12, for an effective amount of time so that a gel or a colloidal suspension is formed;

(b) admixing the gel or colloidal suspension with another gel or colloidal suspension containing cations of one or more elements selected from the group consisting of transition metals and other elements selected from Al, Si, Th, U, the lanthanides, and groups IA and IIA of the Periodic Table of the elements; wherein the transition metals of (a) and (b) above are selected from groups IB, IIB, VIB, VIIB, and VIII of the Periodic Table of the Elements;

(c) adjusting the pH of the gel admixture from (b) above to about 7 or above with a 0.5 to 10N aqueous base solution;

(d) separating the resulting solid precursor from the liquid phase of the gel admixture;

(e) washing the precursor with water; and (f) drying the precursor.

In preferred embodiments of all the above process schemes the dried solid precursor is washed with water, filtered, and dried again so as to remove entrained soluble material.

Preferred embodiments also include a method wherein the gel, or colloidal suspension of (b) above, contains Al, and one or more of Ca, Mg, and Co.

In other preferred embodiments of the present invention the effective amount of time of admixing of step (a) above is from about 10 to about 100 hours a catalyst precursor composition is prepared which is suitable for being activated for use as an ammonia synthesis catalyst. In such preferred embodiments, the transition metal(s) is (are) selected from the group consisting of Fe, Mo, W, Re, Ru, Os, Ni, Rh and Co and the promoter element(s) is (are) selected from the group consisting of Al, Ca, Mg, Ba, Sr, K, Rb, and Cs.

In still other preferred embodiments of the present invention a $C_1$ to $C_3$ alcohol is used as a cosolvent.

DETAILED DESCRIPTION OF THE INVENTION

Catalyst compositions which may be prepared by the present invention are comprised of about 15 to about 85 wt.% of metal crystallites interspersed with about 15 to about 85 wt.% of promoter particles which compositions are sometimes referred to herein as dual colloid catalysts because the sizes of the crystallites and the promoter particles are both of colloid size and are within an order of magnitude of each other. For example, the size, d, of the metal crystallites are such that at least about 80% will have a diameter, between about 25 Å and 500 Å preferably between about 25 Å and 250 Å, more preferably between about 40 Å and 150 Å and most preferably between about 40 Å and 100 Å, with the proviso that the crystallite size distribution of at least about 80% of these correspond to the relationship $0.5D<d<2D$ where D is the median of the diameter of this 80%. As for the promoter phase, it is comprised of particles wherein at least about 80% have an average diameter from about 15 Å to about 1500 Å wherein the median diameter (D) of the metal crystallites and the median diameter of 80% of the promoter particles do not differ by more than a factor of about 20.

The metal crystallites of the catalysts of the present invention may be comprised of one or more of the following: (a) a single transition metal, (b) two or more metals, including alloys, wherein at least about 50 wt.% of the metal content is one or more transition metals, and (c) one or more reducible transition metal carbides, nitrides, and oxides. By reducible, we mean converted to the metallic state by hydrogen at temperatures up to about 650° C. and at hydrogen pressures up to about 300 atm. where the ratio of hydrogen partial pressure to the partial pressure of water, $CH_4$, and $NH_3$ is at least 1000:1. The transition metal may be selected from those reducible metals from Groups IB, IIB, VIB, VIIB, and VIII of the Periodic Table of the Elements, as illustrated on the inside cover of Handbook of Chemistry and Physics, 55th Edition, CRC Press, 1974–1975. Preferred transition metals especially for use in ammonia synthesis include Mo, Re, W, Fe, Ru, Os, Co, Rh, and Ni. Of course, the choice of transition metals will depend on the reaction being catalyzed.

The promoter phase which is interspersed with the crystallites of the present invention is comprised of nonreducible materials and impart improved activity, selectivity, or stability to the catalysts. The term, nonreducible material, as used herein, means a material which is not reduced to the metallic state when subjected to the atmosphere and process conditions under which it will be used. That is, the particles of the promoter phase are not catalytically active in the sense the metal crystallites are; although, they may perform a different catalytic function than the metal crystallites for any particular reaction. Non-limiting examples of materials which may serve as the promoter phase herein include the structural promoters such as refractory metal oxides, for example, $Al_2O_3$, MgO, CaO, and metal nitrides and carbides. Also included are electronic promoters such as the oxides, nitrides, amides and hydroxides of metals having a Pauling electronegativity of 1.3 or less. The promoter phase of the precursor may also contain compounds of the promoter elements, such as halides, carbonates, nitrates, nitrites, phosphates, sulfates, etc. It is preferred that such promoter compounds be chosen such that their anions not give rise to materials which will poison the active catalyst. For example, precursor material containing sulfates would be undesirable for activation and use for ammonia synthesis. The particular material chosen for the promoter phase will primarily depend on the reaction in which it is used. For example, if the promoter is used for a catalyst for ammonia synthesis, it is preferred that the promoter phase be highly basic and include one or more metals selected from the group consisting of the alkali metals, the alkaline-earth metals, and lanthanum. Of course, the promoter phase of the catalysts of the present invention is not restricted to any particular type of promoter.

They may, in fact, function as more than one type, for example, a promoter may serve as both a structural and an electronic promoter, such as MgO.

The term "promoter phase" as used herein includes particles of a single composition as well as particles comprised of different compositions.

Individual promoter particles may become indistinguishable through the formation of a more or less continuous network of promoter since the promoter is often amorphous or not very crystalline. In this case the separation between adjacent metal crystallites caused by the promoter phase may vary from about 15 Å to about four times the median diameter of the metal crystallites.

The metal crystallite phase of the catalyst of the present invention may be represented by $A_aB_bC_cD_dE_eF_fG_g$, and the nonreducible promoter phase may be represented by $H_hI_iJ_jK_kL_lAl_mSi_s$, where:

A is one or more of Fe, Ru, Os and a is from 0 to 4;
B is one or more of Co, Rh, Ir and b is from 0 to 4;
C is one or more of Ni, Pd, Pt and c is from 0 to 4;
D is one or more of Re, Mo, W and d is from 0 to 2;
E is one or more of Mn, Cr and e is from 0 to 0.5;
F is one or more of Cu, Ag, Au and f is from 0 to 2;
G is one or more of Zn, Cd and g is from 0 to 1;
wherein the values of d, e, and g are such that the metals of D, E, and G will be reduced to the metallic or metal alloy state under reducing conditions when in combination with metals of A, B, C, and F in amounts of a, b, c, and f, and wherein the sum $a+b+c+d+e+f+g$ is between 1 and 4, and H is one or more of Be, Mg, Ca, Sr, Ba and h is from 0 to 4;
I is one or more of Li, Na, K, Rb, Cs, and i is from 0 to 4;
J is one or more of Sc, Y, La, Ce, Pr, Nd, Sm, Eu, Gd, Tb, Dy, Ho, Er, Tm, Yb, Lu, Th, U and j is from 0 to 4;
K is one or more of Ti, Zr, Hf, V, Nb, Ta, and k is from 0 to 4;
L is one or more of Cr, Mn, Zn and l is from 0 to 4, where the value of l is such that Cr, Mn, and Zn are not reduced to the metallic or metallic alloy state when in combination with metals of A, B and C in amounts a, b, c under reducing conditions, m and s are each from 0 to 2, wherein the sum $h+i+j+k+l+m+s$ is between 0.1 and 4.

A preferred class of catalyst compositions of the present invention may be represented by the formula:

$$A_aB_bC_cD_dE_eF_f\text{—}H_hI_iJ_jL_lAl_m,$$

where
A is one or more of Fe, Ru, Os and a is from 0 to 4;
B is one or more of Co, Rh and b is from 0 to 4;
C is one or more of Ni, Pd, Pt and c is from 0 to 4;
D is one or more of Re, Mo, W and d is from 0 to 2;
E is Mn and e is from 0 to 0.5;
F is Cu and f is from 0 to 2;
H is one or more of Be, Mg, Ca, Sr, Ba and h is from 0 to 4;
I is one or more of Li, Na, K, Rb, Cs and i is from 0 to 4;
J is one or more of Sc, Y, La, Ce, Pr, Nd, Sm, En, Gd, Tb, Dy, Ho, Er, Tm, Yb, Lu, Th, U and j is from 0 to 4;
L is Cr and l is from 0 to 4;
m is from 0 to 2.

A more preferred class of catalyst compositions of the present invetion may be represented by the formula:

$$A_aB_bC_cD_d\text{—}H_hI_iJ_jL_lAl_m,$$

where
A is one or more of Fe, Ru, Os and a is from 0 to 4;
B is Co and b is from 0 to 4;
C is Ni and c is from 0 to 4;
D is one or more of Mo, W and d is from 0 to 2;
H is one or more of Be, Mg, Ca, Sr, Ba and h is from 0 to 4;
I is one or more of Li, Na, K, Rb, Cs and i is from 0 to 4;
J is one or more of Ce, La and j is from 0 to 4;
L is Cr and l is from 0 to 4;
m is from 0 to 2.

A most preferred class of catalyst compositions of the present invention may be represented by the formula:

$$Fe_aCo_bNi_c\text{—}H_hI_iL_lAl_m,$$

where
a, b, and c are from 0 to 4;
H is one or more of Mg, Ca, Sr, Ba and h is from 0 to 4;
I is one or more of Li, Na, K, Rb, Cs and i is from 0 to 4;
L is Cr and l is from 0 to 4;
m is from 0 to 2.

It is also within the scope of the present invention that the metal crystallite phase contain metallic elements which are difficult to reduce, such as Cr, Zn, and Mn up to an amount at which they are no longer reducible by the reducible metals of the crystallite phase.

In the practice of the present invention the concentration of the solutions, exclusive of the basic solution, in molarity with respect to the elements of the metal crystallite or promoter phase, will range from about 0.5 to 10M, preferably about 0.5 to 8M, more preferably 1 to 5M.

The concentration of the basic solution will range from about 0.5 to 10N, preferably from about 2 to 8N. Non-limiting examples of bases suitable for use herein include hydroxides of the metals of Groups IA, Ba, Ca, Sr, ammonium, quaternary ammonium and mixtures thereof preferably where the quaternary ammonium compound is represented by the formula $R_4N^+$, where each R is independently a $C_1$ to $C_4$ group. The basic solution may also contain up to about 50% by volume of a co-solvent, preferably up to about 20% by volume. Non-limiting examples of such co-solvents include $C_1$ to $C_3$ alcohols, acetone, methylethylketone, glycols and mixtures thereof. Preferred are the $C_1$ to $C_3$ alcohols, and more preferred is methanol.

In the practice of the present invention the pH of the admixture is of sufficient basicity to cause or maintain a gel, or colloidal suspension and to allow hydrolysis of the hydrolyzable transition metal cations. This pH will generally be greater than about 8, although a lower pH may be sufficient to allow and to maintain a gel or colloidal suspension depending on such factors as the type and concentration of the cations in the solutions. For example, cations such as $Fe^{+3}$ and $Al^{+3}$ will hydrolyze at a pH of 5 or lower, whereas cations such as $Mg^{+2}$ and $Co^{+2}$ will hydrolyze at a pH above about 7.

During the admixture procedures of the present invention it is important to prevent the active metal cations from being encapsulated by the promoters. This may be accomplished by: (1) causing rapid and simultaneous precipitation of all hydrolyzable cations during the formation of the gel; or (2) preforming a gel containing the promoter cations and then: (i) adding either another preformed gel containing active metal cations or (ii) forming a gel by the hydrolysis of the hydrolyzable active metal in the presence of the promoter gel.

The temperature at which the procedures of the present invention are conducted will range from just above the freezing point of the admixtures to an effective upper temperature so that substantially all of the cations in the gel, or colloidal suspension which are capable of being in an insoluble hydroxy form are in an insoluble hydroxy form. Preferably, the temperature is from about 0° C. to about 60° C.

More preferred is a temperature from about 10° C. to about 60° C.

After formation of the gel, or colloidal suspension, the solid is separated, washed and dried. Non-limiting separation techniques include filtration and centrifugation. Washing is preferably accomplished by use of high purity water which is used to remove soluble salts from the resulting solid. The solid can be dried at a temperature of about 50° to 100° C. at a reduced pressure. It is preferred to wash the dried precursor to remove entrained soluble material. The dried precursor can then be crushed and sieved. It is also within the scope of this invention to extrude the separated solids or to pelletize or otherwise form the dried solid.

When the present method is practiced by first admixing an aqueous transition metal nitrate solution with a soluble base having a $pK_b$ of about 6 to 12, it is preferred that the transition metal be iron(III) and the base be a bicarbonate in the ratio of about 1 to 2.5 moles of bicarbonate per mole of iron(III), thereby forming a colloidal suspension of polymeric iron(III) hydroxy nitrate.

The precursor compositions of the present invention may be activated before use. For example, when they are to be used in such processes as ammonia synthesis or hydrogenation they must be activated by reduction. This is preferably done by maintaining them at a temperature of about 150° C. and at a space velocity of greater than about 5000 v/v/hr for a few minutes to several hours. The pressure can then be increased to about 1 MPa to about 10 MPa and the temperature to about 320° C. to about 360° C., and holding it at that temperature until activation is complete. This can take several hours to several days. In some cases additional slow heating to about 500° C. may be required, for example, when more difficult to reduce metals are present.

The temperature, pressure, and gas hourly space velocity may then be adjusted to the desired operating conditions for the catalytic reaction. Further heating to operating conditions should be in a moderately (<1° C./min.) controlled manner. Heating the material too rapidly to a high temperature of, e.g., 400° C. or more, without a sufficient exposure to moderate temperatures of, e.g., 150° C. to 360° C., will result in a material having poor catalytic activity for ammonia synthesis. The optimum reduction conditions, i.e., temperature, pressure, space velocity and heating rate, will depend on the catalyst composition and its intended use. The best temperature program for a given dual colloid catalyst of the present invention can often be determined by thermogravimetric analysis and high pressure thermogravimetric analysis tests. Such tests are well known to those skilled in the art and will not be discussed in detail herein.

The active catalyst may be used in the ammonia synthesis reaction directly without removal from the activation reactor. Alternatively, the activated catalyst may be removed from the activation reactor and charged, or pelletized and charged, into a different reactor for use. This may be advantageous because activation of the composition generally results in approximately a 10 to 50% decrease in volume. Non-limiting examples of types of ammonia synthesis reactors which may be employed herein include vertical, horizontal, or radial-flow types which utilize the catalyst as a fixed bed, or the like.

The ammonia synthesis reaction herein is conducted according to procedures well known to those skilled in the art. Thus, nitrogen and hydrogen are passed over the catalysst at elevated temperatures and pressures sufficient to convert at least a portion of the nitrogen and hydrogen to ammonia.

The gaseous mixture of hydrogen and nitrogen which is introduced into the reactor preferably contains hydrogen and nitrogen in a volume ratio of 1:3 to 10:1, respectively, more preferably 1:1 to 4:1. Most preferred, however, is about a stoichiometric volume ratio of 3:1, except in the case of certain ruthenium-containing catalysts for which a nitrogen-rich feed gas is preferred.

The space velocity of the gaseous mixture of nitrogen and hydrogen expressed as volumes of gas at standard conditions per unit volume of catalyst per hour (GHSV), may range from about 1000 to 100,000 v/v/hr or more, depending on the reactor design. Preferred is about 5000 to about 60,000 v/v/hr.

The pressure of the gaseous feedstream for ammonia synthesis will generally be in the range of 0.1 to 30 MPa, preferably, from about 4 to 20 MPa.

For ammonia synthesis at high temperatures ($\geq 350°$ C.) catalyst containing less than 7 wt.% potassium are preferred.

The following examples serve to more fully describe the manner of making and using the abovedescribed invention, as well as to set forth the best modes contemplated for carrying out various aspects of the invention. It is understood that these examples in no way serve to limit the true scope of this invention, but rather, are presented for illustrative purposes.

EXAMPLE 1

Catalyst precursor A was prepared by dissolving the following nitrates in sufficient distilled water to give a total solution volume of 600 cc: 6.7 g $Co(NO_3)_2.6H_2O$, 17.4 g $Mg(NO_3)_2.6H_2O$, 54.2 g $Al(NO_3)_3.9H_2O$, and 162.8 g $Fe(NO_3)_3.9H_2O$. 500 cc of 4N KOH was rapidly added, and a gel formed immediately. The pH was about 10. The resulting gel was vigorously stirred for 15 minutes then filtered. The filter cake was washed twice with 1 L distilled water and filtered after each wash. The filter cake was dried at 50°–80° C. and reduced pressure. No crystalline phases were detected by X-ray diffraction. The surface area was 146 m²/g. Based on elemental analysis, the molar ratio of metallic elements in the catalyst precursor was 3.4Fe:0.19Co:1.0Al:0.55Mg:0.53K.

EXAMPLE 2

Catalyst precursor B was prepared by dissolving 6.6 g $Co(NO_3)_2.6H_2O$ and 17.32 g $Mg(NO_3)_2.6H_2O$ in sufficient distilled water to give a final volume of 200 cc.

The pH was adjusted to 9.7 by adding 19.4 cc 4N KOH. A gel formed during the addition of the base. 54.2 g Al(NO$_3$)$_3$.9H$_2$O was dissolved in sufficient distilled water to give a final volume of 120 cc. The pH was adjusted to 2.4 by adding 1.6 cc 4N KOH. The aluminum nitrate solution was added to the suspension formed from cobalt and magnesium nitrates. The pH was adjusted to 9.4 by adding 144 cc 4N KOH. After stirring the resulting suspension/gel for 30 minutes, a solution of ferric nitrate was added dropwise. The ferric nitrate solution was prepared by adding sufficient distilled water to 162.8 g Fe(NO$_3$)$_3$.9H$_2$O to give a final volume of 280 cc. The pH was adjusted to 0.9 by adding 20.0 cc 4N KOH. During dropwise addition of the ferric nitrate solution, the pH of the slurry/gel gradually decreased. When the pH decreased to approximately 8.0, addition of ferric nitrate solution was halted, and sufficient 4N KOH was added to bring the pH up to approximately 12. Then addition of ferric nitrate solution was resumed. This alternate addition of ferric nitrate solution and 4N KOH was continued until all the ferric nitrate solution had been added. After addition was complete, the suspension/gel was stirred an additional 55 minutes. All operations were done at room temperature, however, due to the exothermicity of the hydrolysis reactions, and due to heating caused by vigorous mixing, the maximum temperature reached about 50° C. The suspension was filtered, the solid resuspended in 400 cc distilled water, filtered, again resuspended in 400 cc distilled water and filtered. The resulting solid mass was dried overnight at 50°–70° C. and reduced pressure. No crystalline phases were detected by X-ray diffraction. The surface area was 306 m$^2$/gm. Based on elemental analysis, the molar ratio of metallic elements in the catalyst precursor was 3.4Fe:0.18Co:1.00Al:0.47Mg:0.13K.

EXAMPLE 3

Catalyst precursor C was prepared by dissolving 150 g Fe(NO$_3$)$_3$.9H$_2$O in 500 cc distilled water. 85.2 g KHCO$_3$ was slowly added in 2–3 g portions, and the solution was continuously stirred. After addition of KHCO$_3$ was complete, N$_2$ was bubbled through the solution for about 15 minutes. This solution was allowed to stand for 20 hours. A second solution was prepared by dissolving 10.8 g Co(NO$_3$)$_2$.6H$_2$O, 25.1 g Al(NO$_3$)$_3$.9H$_2$O, and 8.3 g Mg(NO$_3$)$_2$.6H$_2$O in 100 cc distilled water. The pH of this solution was adjusted to 6.3 by adding 67.4 cc 4N aqueous KOH during which a gel/suspension formed. While vigorously stirring the gel, the solution (actually a colloidal suspension of iron hydroxy nitrate polymeric species) first prepared was rapidly added. The pH of the resulting gel was adjusted to about 13 by adding 250 cc 4N aqueous KOH. The gel was stirred an additional 20 minutes, then filtered. The filter cake was washed two times in 1 L distilled water each time. The resulting filter cake was dried at 70° C. and reduced pressure. No crystalline phases were detected by X-ray diffraction. Based on elemental analysis, the molar ratio of metallic elements in the catalyst precursor was: 1.8Fe:0.15Co:1.0Al:0.94Mg:0.82K.

EXAMPLE 4

Catalyst precursor D was prepared by dissolving the following nitrates in sufficient distilled water to give a total solution volume of 600 cc: 26.8 g Co(NO$_3$)$_2$.6H$_2$O, 8.2 g Ca(NO$_3$)$_2$.4H$_2$O, 27.1 g Al(NO$_3$)$_3$.9H$_2$O, and 325.5 g Fe(NO$_3$)$_3$.9H$_2$O. To this solution, 800 cc of 4N KOH in methanol/water (20% by volume methanol) was rapidly added, and the resulting thick, brown gel was vigorously stirred for 10 minutes. The pH of the gel/suspension was about 13. The gel was filtered and washed twice with 1 L distilled water each time. After the second wash the filter cake was dried at 70°–80° C. and reduced pressure. No crystalline phases were detected by X-ray diffraction. The surface area was 162 m$^2$/g. Based on elemental analysis, the molar ratio of metallic elements in the catalyst precursor was 26.0Fe:2.9Co:1.0Al:1.11Ca:2.65K.

EXAMPLE 5

Catalyst precursors A–D, described in Examples 1–4 above, were activated by treatment with flowing H$_2$:N$_2$ (2.5–3.0:1) at a GHSV of 10,000–15,000, and atmospheric pressure, while slowly increasing the temperature to 480°–490° C. and maintaining the temperature at 480°–490° C. for 10–30 hours. After activation, the catalysts derived from precursors A–D were analyzed by X-ray diffraction. The only crystalline phase detected in each case was α-Fe metal. Analysis of the diffraction line shapes gave a reasonable estimate of the average size of the iron crystallites. For the catalysts derived from precursors A–D, the average crystallite sizes were, respectively, 150 Å, 116 Å, 300 Å, and 230 Å.

The catalysts derived form precursors A and B were also analyzed using transmission electron microscopy (TEM). The TEM micrographs of A showed two types of particles predominating. The electron dense α-Fe particles were from about 50 Å to 300 Å in diameter; most were in the range of 100 Å to 200 Å, which agrees with the average α-Fe crystallite size of 150 Å determined by X-ray diffraction. These α-Fe crystallites were interspersed with another type of particle, which was less electron dense and which contained promoter elements, such as Al and Mg predominantly in the form of non-reducible oxides, such as Al$_2$O$_3$, MgO, and mixed oxides. These oxides were present as amorphous particles interspersed with the active metal particles of α-Fe. The size of the promoter particles from A ranged from about 100 Å to about 600 Å; most were in the range of 200 Å to 400 Å.

The TEM results on the catalyst derived from precursor B showed that electron dense α-Fe particles in the range of 45 Å to 300 Å were present. The promoter particles which were less electron dense and also were amorphous, formed a substantially continuous network with the α-Fe crystallites interspersed. The α-Fe crystallites were separated by distances from about 15 Å to 200 Å.

EXAMPLE 6

Use as Ammonia Catalysts

The activated catalysts from Example 5 were tested as ammonia synthesis catalysts. The tests were performed in stainless steel tubular reactors using a feed of 3:1 H$_2$:N$_2$. For comparison, a sample of a conventional, commercially available, triply promoted fused iron catalyst (supplied as KM-1 by Haldor-Topsoe) was also tested. The results are shown in Table II for activated catalysts A–D and the commercial catalyst E and F. Substantially higher activities were observed for the subject catalysts compared to the conventional fused iron catalyst.

TABLE II

| Catalyst Precursor | P (PSIA) | T (°C.) | GHSV | Rate* |
|---|---|---|---|---|
| A | 624 | 400 | 5200 | 31 ± 2 |
| B | 631 | 425 | 5500 | 25 ± 2 |
| C | 626 | 403 | 5400 | 14 ± 2 |
| D | 620 | 418 | 5000 | 12 ± 2 |
| E | 624 | 404 | 5000 | 9 ± 1 |
| F | 624 | 423 | 5000 | 9 ± 1 |

*Rate = g-mole $NH_3$/kg catalyst/hr.

What is claimed is:

1. A method for preparing amorphous catalyst precursor compositions containing one or more reducible phases and one or more nonreducible phases which method comprises:
   (I) forming a gel, or colloidal suspension, by admixing, under sufficient agitation, (a) a 0.5 to 10M aqueous solution containing one or more soluble salts or complexes of one or more transition metals selected from Groups IB, IIB, VIB, VIIB, and VIII of the Periodic Table of the Elements, and wherein at least one of the transition metals is reducible and hydrolyzable, and one or more nonreducible elements selected from the group consisting of Cr, Al, Si, Th, U, the lanthanides and Sc, Y, Ti, Zr, Hf, V, Nb, and Ta, and elements of Groups IA and IIA of the Periodic Table of the Elements, with (b) a 0.5 to 10N aqueous base solution to cause the formation of a gel or colloidal suspension;
   (II) separating the resulting solid precursor from the liquid phase of the admixture of (I) above;
   (III) washing the precursor with water; and
   (IV) drying the precursor.

2. The method of claim 1 wherein the aqueous base solution of (Ib): (a) is prepared from hydroxides of one or more of Li, K, Na, Rb, Cs, Ca, Ba, Sr, $NH_4^+$, and $R_4N^+$ where each R is independently a $C_1$ to $C_4$ group, and (b) contains from 0 to 50 volume % of one or more cosolvents selected from the group consisting of the $C_1$ to $C_3$ alcohols, acetone, methylethyl ketone, and glycols.

3. The method of claim 2 wherein the precursor is activated by reduction and the resulting catalyst composition comprises:
   (i) from about 15 to about 85 wt% of crystallites selected from the group consisting of (i) crystallites of one or more transition metals and (ii) crystallites of reducible transition metal carbides, nitrides, and oxides, and mixtures thereof, said transition metals being selected from those reducible metals from Groups IB, IIB, VIB, VIIB, and VIII of the Periodic Table of the Elements, wherein at least 80% of the crystallites have a diameter, d, between about 25 Å and 500 Å with the proviso that the crystallite size distribution of at least about 80% of these be expressed by the relationship $0.5 < d < 2D$ where D is the median of the diameters of this 80%;
   (ii) from about 15 to about 85 wt% of a nonreducible promoter phase interspersed with the metal crystallites and containing at least one element selected from the group consisting of Cr, Al, Si, Th, U, the lanthanides, and Sc, Y, Ti, Zr, Hf, V, Nb, and Ta and Group IA and IIA, of the Periodic Table of the Elements, wherein the promoter phase is comprised of particles of which at least about 80% have a diameter between about 15 Å and 1500 Å wherein the media diameter (D) of the metal crystallites and the median diameter of the 80% of the promoter particles do not differ by more than a factor of about 20.

4. The method of claim 3 wherein the transition metals of I(a) above are selected from the group consisting of Fe, Ru, Os, Co, Rh, Ni, Pd, Pt, Re, Mo, W, Mn, and Cu and the one or more other elements are selected from the group consisting of Be, Mg, Ca, Sr, Ba, Li, Na, K, Rb, Cs, Sc, Y, La, Ce, Pr, Nd, Sm, Eu, Gd, Tb, Dy, Ho, Er, Tm, Th, Lu, U, Cr, and Al.

5. The method of claim 4 wherein the transition metals are selected from the group consisting of Fe, Ru, Os, Co, Ni, Mo, and W and the one or more other elements is selected from the group consisting of Be, Mg, Ca, Sr, Ba, Li, Na, Rb, Cs, Ce, La, Cr, and Al.

6. The method of claim 5 wherein the transition metals are selected from the group consisting of Fe, Co, and Ni and the one or more other elements are selected from the group consisting of Mg, Ca, Sr, Ba, Li, Na, K, Rb, Cs, Cr, and Al.

7. The method of claim 6 wherein the aqueous solution of I(a) contains only Fe and Co as the transition metals, Al and one or more of Ca and Mg as the one or more other elements, and the base of I(b) is prepared from KOH.

8. The method of claim 5 wherein the concentration of the solution of I(a) is from about 0.5 to 8M and the solutions are admixed at a temperature from about 0° C. to about 60° C.

9. The method of claim 6 wherein the concentration of the solution of I(a) is from about 1 to 5M and the solutions are admixed at a temperature from about 0° C. to about 60° C.

10. The method of claim 1 wherein the dried precursor is rewashed, filtered, and dried again thereby removing entrained soluble material.

11. The method of claim 4 wherein the dried precursor is rewashed, filtered, and dried again thereby removing entrained soluble material.

12. The method of claim 6 wherein the dried precursor is rewashed, filtered, and dried again thereby removing entrained soluble material.

13. The method of claim 7 wherein the concentration of the solutions of Ia is from about 1 to 5M and the solutions of Ia and Ib are admixed at a temperature from about 0° to about 60° C.; and (b) the dried precursor is rewashed, filtered, and dried again thereby removing entrained soluble material.

14. A method for preparing amorphous catalyst precursor compositions which method comprises:
   (a) forming a gel, or colloidal suspension, by admixing (i) one or more solutions containing one or more soluble salts or complexes of one or more elements selected from the group consisting of Cr, Al, Si, Th, U, the lanthanides and Sc, Y, Ti, Zr, Hf, V, Nb, and Ta, and elements of Groups IA and IIA of the Periodic Table of the Elements, with (ii) a 0.5 to 10N aqueous base solution to cause the formation of a gel or colloidal suspension,
   (b) adding to the gel, or colloidal suspension of (a) above, an aqueous solution containing at least one soluble salt or complex of one or more transition metals selected from Groups IB, IIB, VIB, VIIB, and VIII of the Periodic Table of the Elements, and wherein at least one of the transition metals is reducible and hydrolyzable;

(c) maintaining the pH of the resulting admixture at a sufficient basicity to maintain the admixture in gel or colloidal form, and to ensure hydrolysis of the hydrolyzable transition metal cations;

(d) separating the solid precursor from the liquid phase of the admixture of (c) above;

(e) washing the precursor with water; and (f) drying the precursor.

15. The method of claim 14 wherein the base solution of (aii): (a) is prepared from the hydroxides of one or more of Li, K, Na, Rb, Cs, Ca, Ba, Sr, $NH_4^+$, and $R_4N^+$ wherein each R is independently a $C_1$ to $C_4$ group, and (b) contains from 0 to 50 volume % of one or more cosolvents selected from the group consisting of the $C_1$ to $C_3$ alcohols, acetone, methylethylketone, and glycols.

16. The method of claim 15 wherein the precursor is activated by reduction and the resulting catalyst composition comprises;

(i) from about 15 to about 85 wt% of crystallites selected from the group consisting of (i) crystallites of one or more transition metals and (ii) crystallites of reducible transition metal carbides, nitrides, and oxides, and mixtures thereof, said transition metals being selected from those reducible metals from Groups IB, IIB, VIB, VIIB, and VIII of the Periodic Table of the Elements, wherein at least 80% of the crystallites have a diameter, d, between about 25 Å and 500 Å with the proviso that the crystallite size distribution of at least about 80% of these be expressed by the relationship $0.5D < d < 2D$ where D is the median of the diameters of this 80%;

(ii) from about 15 to about 85 wt% of a nonreducible promoter phase interspersed with the metal crystallites and containing at least one element selected from the group consisting of Cr, Al, Si, Th, U, the lanthanides, and Sc, Y, B, Ti, Zr, Hf, V, Nb, and Ta and Group IA, IIA, of the Periodic Table of the Elements, wherein the promoter phase is comprised of particles of which at least about 80% have a diameter between about 15 Å and 1500 Å wherein the media diameter (D) of the metal crystallites and the median diameter of the 80% of the promoter particles do not differ by more than a factor of about 20.

17. The method of claim 16 wherein the transition metals of (b) are selected from the group consisting of Fe, Ru, Os, Co, Rh, Ni, Pd, Pt, Re, Mo, W, Mn, and Cu, and the elements of (ai) are selected from the group consisting of Be, Mg, Ca, Sr, Ba, Li, Na, K, Rb, Cs, Sc, Y, La, Ce, Pr, Nd, Sm, Eu, Gd, Tb, Dy, Ho, Er, Tm, Th, Tb, Lu, U, Cr, and Al.

18. The method of claim 17 wherein the transition metals are selected from the group consisting of Fe, Ru, Os, Co, Ni, Mo, and W, and the elements of (ai) are selected from the group consisting of Be, Mg, Ca, Sr, Ba, Li, Na, Rb, Cs, Ce, La, Cr, and Al.

19. The method of claim 18 wherein the transition metals are selected from the group consisting of Fe, Co, and Ni, and the elements of (ai) are selected from the group consisting of Mg, Ca, Sr, Ba, Li, Na, K, Rb, Cs, Cr, and Al.

20. The method of claim 19 wherein: (a) the aqueous solution of (b) contains only Fe and Co as the transition metals, (b) the one or more solutions of (ai) contain only Al and one or both of Ca and Mg, and (c) the base solution of (aii) is prepared from KOH.

21. The method of claim 18 wherein the concentration of the solutions of (ai) and (b) are from about 0.5 to 8M and the solutions are admixed at a temperature from about 0° to about 60° C.

22. The method of claim 19 wherein the concentration of the solutions of (ai) and (b) are from about 1 to 5M and the solutions are admixed at a temperature from about 0° to about 60° C.

23. The method of claim 14 wherein the dried precursor is rewashed, filtered, and dried again thereby removing entrained soluble material.

24. The method of claim 17 wherein the dried precursor is rewashed, filtered, and dried again thereby removing entrained soluble material.

25. The method of claim 19 wherein the dried precursor is rewashed, filtered, and dried again thereby removing entrained soluble material.

26. The method of claim 20 wherein:

(a) concentration of the solutions of (ai) and (b) are from about 1 to 5M and the solutions are admixed at a temperature from about 0° to about 60° C.; and (b) The dried precursor is rewashed, filtered, and dried again thereby removing entrained soluble material.

27. A method for preparing amorphous catalyst precursor compositions which method comprises:

(a) admixing (i) an aqueous transition metal nitrate solution with (ii) a soluble base having a $pK_b$ from about 6 to about 12, for an effective, amount of time so that a gel or colloidal suspension is formed;

(b) admixing the gel or colloidal suspension with another gel or colloidal suspension containing cations of one or more elements selected from the group consisting of transition metals and other elements selected from Al, Si, Th, U, the lanthanides and Groups IA and IIA of the Periodic Table of the Elements; wherein the transition metals of (a) and (b) above are selected from Groups IB, IIB, VIB, VIIB, and VIII of the Periodic Table of the Elements;

(c) adjusting the pH of the gel admixture to about 7 or above with a 0.5 to 10N aqueous base solution;

(d) separating the resulting solid precursor from the liquid phase of the gel admixture;

(e) washing the precursor with water; and (f) drying the precursor.

28. The method of claim 27 wherein the base solution of (c): (a) is prepared from hydroxides of one or more of Li, K, Na, Rb, Cs, Ca, Ba, Sr, $NH_4^+$, and $R_4N^+$ where each $R^1$ is independently a $C_1$ to $C_4$ group, and (b) contains from 0 to 50 volume % of one or more cosolvents selected from the group consisting of the $C_1$ to $C_3$ alcohols, acetone, methylethylketone, and glycols.

29. The method of claim 28 wherein the precursor is activated by reduction and the resulting catalyst composition comprises:

(i) from about 15 to about 85 wt% of crystallites selected from the group consisting of (i) crystallites of one or more transition metals and (ii) crystallites of reducible transition metal carbides, nitrides, and oxides, and mixtures thereof, said transition metals being selected from those reducible metals from Groups IB, IIB, VIB, VIIB, and VIII of the Periodic Table of the Elements, wherein at least 80% of the crystallites have a diameter, d, between about 25 Å and 500 Å with the proviso that the crystallite size distribution of at least about 80% of these be expressed by the relationship 0.5D < d < 2D where D is the median of the diameters of this 80%;

(ii) from about 15 to about 85 wt% of a nonreducible promoter phase interspersed with the metal crystallites and containing at least one element selected from the group consisting of Cr, Al, Si, Th, U, the lanthanides, and Group IA, IIA, of the Periodic Table of the Elements, wherein the promoter phase is comprised of particles of which at least about 80% have a diameter between about 15 Å and 1500 Å wherein the median diameter (D) of the metal crystallites and the median diameter of the 80% of the promoter particles do not differ by more than a factor of about 20.

30. The method of claim 29 wherein the transition metals are selected from the group consisting of Fe, Ru, Os, Co, Rh, Ni, Pd, Pt, Re, Mo, W, Mn, and Cu, and the one or more other elements are selected from the group consisting of Be, Mg, Ca, Sr, Ba, Li, Na, K, Rb, Cs, Sc, Y, La, Ce, Pr, Nd, Sm, Eu, Gd, Tb, Dy, Ho, Er, Tm, Th, Tb, Lu, U, Cr, and Al.

31. The method of claim 30 wherein the transition metals are selected from the group consisting of Fe, Ru, Os, Co, Ni, Mo, and W, and the one or more other elements are selected from the group consisting of Be, Mg, Ca, Sr, Ba, Li, Na, K, Rb, Cs, Ce, La, Cr, and Al.

32. The method of claim 31 wherein the transition metals are selected from the group consisting of Fe, Co and Ni, and the one or more other elements are selected from the group consisting of Mg, Ca, Sr, Ba, Li, Na, K, Rb, Cs, Cr, and Al.

33. The method of claim 27 wherein the gel or colloidal suspension of (b) contains only Al, and one or more of Ca, Mg and Co.

34. The method of claim 27 wherein base in (aii) is a bicarbonate wherein the transition metla is the Group VIII metal Fe (III) and the molar ratio of bicarbonate to Fe(III) is about 1 to 2.5, the admixing of steps (a) and (b) are performed at a temperature from about 10° C. to about 60° C., and the effective amount of time of step (a) is from about 10 to about 100 hours.

35. The method of claim 32 wherein base in aii is a bicarbonate wherein the transition metal is the Group VIII metal Fe (III) and the molar ratio of bicarbonate to Fe(III) is about 1 to 2.5, the admixing of steps (a) and (b) are performed at a temperature from about 10° C. to about 60° C., and the effective amount of time of step (a) is from about 10 to about 100 hours.

36. The method of claim 27 wherein the dried precursor is rewashed, filtered, and dried again thereby removing entrained soluble material.

37. The method of claim 30 wherein the dried precursor is rewashed, filtered, and dried again thereby removing entrained soluble material.

38. The method of claim 32 wherein the dried precursor is rewashed, filtered, and dried again thereby removing entrained soluble material.

39. An activated catalyst prepared in accordance with claim 3.

40. An activated catalyst prepared in accordance with claim 6.

41. An activated catalyst prepared in accordance with claim 29.

* * * * *